(12) United States Patent
Armbruster et al.

(10) Patent No.: US 9,426,094 B2
(45) Date of Patent: Aug. 23, 2016

(54) NETWORK ARRANGEMENT HAVING NETWORK DEVICES COUPLED TO ONE ANOTHER IN A RING TOPOLOGY

(75) Inventors: Michael Armbruster, München (DE); Ludger Fiege, Grafing (DE); Johannes Riedl, Ergolding (DE); Thomas Schmid, Nürtingen (DE); Andreas Zirkler, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/345,105

(22) PCT Filed: Sep. 3, 2012

(86) PCT No.: PCT/EP2012/067121
§ 371 (c)(1),
(2), (4) Date: Mar. 14, 2014

(87) PCT Pub. No.: WO2013/041355
PCT Pub. Date: Mar. 28, 2013

(65) Prior Publication Data
US 2014/0341224 A1 Nov. 20, 2014

(30) Foreign Application Priority Data
Sep. 19, 2011 (DE) .................. 10 2011 082 965

(51) Int. Cl.
*H04L 12/28* (2006.01)
*H04L 12/935* (2013.01)
(Continued)

(52) U.S. Cl.
CPC ............. *H04L 49/30* (2013.01); *H04L 12/42* (2013.01); *H04L 12/437* (2013.01); *H04L 12/4641* (2013.01); *H04L 41/12* (2013.01)

(58) Field of Classification Search
CPC ..................................................... H04L 12/437
See application file for complete search history.

(56) References Cited

U.S. PATENT DOCUMENTS

| | | | |
|---|---|---|---|
| 2008/0095047 A1 | 4/2008 | Skalecki et al. | |
| 2009/0122695 A1* | 5/2009 | Dam ............ | H04L 12/437 370/223 |
| 2010/0020809 A1* | 1/2010 | Jones ............ | H04L 12/4645 370/395.53 |

FOREIGN PATENT DOCUMENTS

| | | |
|---|---|---|
| CN | 101030901 A | 9/2007 |
| CN | 101188564 A | 5/2008 |

(Continued)

OTHER PUBLICATIONS

German Office Action dated May 11, 2012 in corresponding German Patent Application No. DE 10 2011 082 965.2 with English translation.

(Continued)

*Primary Examiner* — Maharishi Khirodhar
(74) *Attorney, Agent, or Firm* — Lempia Summerfield Katz LLC

(57) ABSTRACT

Systems and methods are provided for operating a network arrangement including multiple network devices that are coupled to each other in a ring structure. Each network device includes a control device and a switch device with at least two ports for coupling to a communication path. During operation, at least two VLANs are simultaneously provided in the ring structure, and the sending of a data packet from the control device of a selected network device is performed via a port of the switch device in one of the two VLANs. In order to achieve this, the other port of the switch device of the selected network device is deactivated for the one VLAN. By using two VLANs, a redundant and reliable data transmission may be achieved. A destabilization of the VLANs in the network ring is prevented by the targeted deactivation of specific ports of the sending network device.

17 Claims, 7 Drawing Sheets

(51) Int. Cl.
*H04L 12/42* (2006.01)
*H04L 12/437* (2006.01)
*H04L 12/46* (2006.01)
*H04L 12/24* (2006.01)

(56) References Cited

FOREIGN PATENT DOCUMENTS

| | | | | |
|---|---|---|---|---|
| EP | 1461890 B1 | 12/2008 | | |
| IN | WO 2011027361 A2 * | 3/2011 | .......... | H04L 43/0811 |
| JP | 2004032354A A | 1/2004 | | |
| JP | 2009159636A A | 7/2009 | | |
| JP | 2009212668A A | 9/2009 | | |
| JP | 2010153944 A | 7/2010 | | |
| WO | 2008106907 A1 | 9/2008 | | |

OTHER PUBLICATIONS

International Search Report and Written Opinion in corresponding PCT Application No. PCT/EP2012/067121 dated Dec. 6, 2012, with English translation.

Learning with Cisco "Catalyst 3750"—the present company internal LAN, Net Work Magazine, Japan, Ascii Co., vol. 9, Release 12, pp. 150-153, Jan. 12, 2004.

Japanese Office Action for corresponding Japanese Application No. 2014-531161, mailed Apr. 13, 2015, with English Translation.

Chinese office Action for related Chinese Application No. 201280045517.1 dated Mar. 4, 2016, with English Translation.

* cited by examiner

NETWORK ARRANGEMENT HAVING NETWORK DEVICES COUPLED TO ONE ANOTHER IN A RING TOPOLOGY

CROSS-REFERENCE TO RELATED APPLICATIONS

The present patent document is a §371 nationalization of PCT Application Ser. No. PCT/EP2012/067121, filed Sep. 3, 2012, designating the United States, which is hereby incorporated by reference, and this patent document also claims the benefit of DE 10 2011 082 965.2, filed on Sep. 19, 2011, which is also hereby incorporated by reference.

TECHNICAL FIELD

The present embodiments relate to methods for operating a network arrangement, and to network arrangements that work using the proposed methods. The operating methods may be used, in particular, in an Ethernet environment.

BACKGROUND

Communications networks are being used increasingly widely for measuring complex technical systems and for open-loop and closed-loop control of the systems. For example, networks are being used increasingly in motor vehicles in order to develop vehicle control systems. In corresponding complex and safety-relevant technical systems, high demands are placed on the availability of the control elements provided as network devices. The failure of individual components such as sensors or control devices, for instance, must not result in the failure of the entire system. Drive-by-wire systems are relevant to safety, in which electric motors are used to convert the steering-wheel position into wheel positions via a network-coupling of sensors, control devices and actuators.

In these systems, data is commonly exchanged via a packet-based communications network in such a way that in the event of a single error in the communications network, the data arrives without loss of information. For example, data may be sent more than once from a source node to a destination node so that the data may be received reliably even when there is a network fault. The HSR protocol (High-availability Seamless Redundancy), for instance, is known for Ethernet applications. HSR requires the network to have a ring topology, however, which is fundamentally problematic for Ethernet networks. The likewise known PRP (Parallel Redundancy Protocol) requires two parallel networks.

In particular, for networks that are based on the Ethernet standard, ring topologies may only be implemented at high cost. U.S. 2010/0020809 A1 defines a method in which a virtual local area network (VLAN) in an Ethernet network is organized as a ring topology. In this method, each node is assigned a switch that breaks the ring at a suitable point and operating situation.

It is desirable to operate data communication, and, in particular, data communication based on an Ethernet structure, with a higher degree of error protection. Normally, this requires the implementation of two disjunctive communications paths from a data source to a destination node.

SUMMARY AND DESCRIPTION

The scope of the present invention is defined solely by the appended claims and is not affected to any degree by the statements within this summary. The present embodiments may obviate one or more of the drawbacks or limitations in the related art.

It is the object of the present embodiments to provide an improved method and/or a network arrangement.

Hence a method is proposed for operating a network arrangement that includes a plurality of network devices coupled to one another in a ring topology. In this case, each network device has a control device and a switch device including at least two ports for coupling to a communications path. The method includes: simultaneously providing at least two VLANs in the ring topology; sending a data packet from the control device of a selected network device via a port of the switch device into one of the two VLANs; and disabling for the one VLAN the other port of the switch device of the selected network device.

Here the "one VLAN" is understood to mean a first VLAN, and the "other VLAN" is understood to mean a second VLAN implemented independently of the first VLAN. The VLANs are implemented in the same network infrastructure. A VLAN separates physical networks into logical sub-networks that act substantially independently of one another.

The network devices may also be referred to as network nodes, users in a network or even as control components.

By simultaneously providing a plurality of VLANs, data may be sent and received redundantly and simultaneously via the network infrastructure. This achieves an improved error protection. Many network protocols, like the Ethernet protocol, forbid the implementation of ring topologies, because conventionally the loop closure may result in the network collapsing as data packets circulate endlessly. Therefore, it is provided that certain ports of the switch devices are disabled for the one or other VLAN. This results, for example, in two intermeshing ring topologies that are terminated by a sending network device, or, more precisely, a port of the associated switch device.

Disabling certain ports prevents data packets being able to be forwarded continuously in the ring topology and being able to result in an unwanted loop closure of the network. In this regard, the communications path in the form of a ring is broken by a sending network device. Providing two VLANs allows that even in the event of a single error, one of the VLANs is always unimpaired and therefore data may be transmitted reliably.

Data received twice, for example, data arriving via the different VLANs, may be filtered out at the destination node or the destination network device using known techniques. For example, method aspects of the PRP or HSR protocol are suitable for filtering.

In a variant of the method, the method further includes: sending the data packet from the control device of the selected network device via the other port of the switch device into the other of the two VLANs; and disabling the one port of the switch device of the selected network device for the other VLAN, in particular, for receiving or sending.

The data packet may be sent into the two VLANs simultaneously. In particular, the data packet may be sent using a unicast address, a multicast address or a broadcast address.

In embodiments of the method, the method further includes comparing the data packets that were received via the first VLAN with the data packets that were received via the second VLAN. It is thereby possible to perform at each network node or network device a consistency check of the data packets received via the different VLANs.

In the method, all the ports of the switch devices in the network arrangement may be enabled for a particular VLAN except for that port that belongs to a switch device of a sending network device and from which the data packet is not sent. Thus, in the case in which two ports for each switch device couple to the communications paths, the respective other, non-sending port breaks the VLAN ring into which the data is transmitted.

It is provided according to a further aspect of the method to disable the port that belongs to a switch device for the VLAN of a network device receiving the data packet via the VLAN and that is coupled via the other VLAN to the other port of the switch device of the sending network device. This achieves redundant opening of the respective VLAN ring. For instance, an error in forward tables of a respective switch may result in the situation that an unintended loop closure arises in the VLAN, whereby the network may collapse. The additional disabling of a further (adjacent) port in the communications path of the ring topology prevents an unintended loop closure in practice.

In addition, a network arrangement is proposed that includes network devices coupled to one another in a ring topology. In this network arrangement, each network device has a control device and a switch device including at least two ports for coupling to a communications path of the ring topology. The network devices are configured to provide simultaneously at least two VLANs in the ring topology. The network devices are also configured such that when a data packet is sent from the control device of the network device via a port of the switch device into the VLAN, the other port of the switch device is disabled for the VLAN, in particular, for sending or receiving.

The network devices may be configured so as to carry out a method as described above.

In one embodiment of the network arrangement, at least one network device includes a first switch device and a second switch device, wherein the first switch device is assigned to the first control device, and the second switch device is assigned to a second control device. The switch devices here each include at least two ports and are communicatively coupled to one another.

Further redundancy may thereby be achieved, and therefore control devices such as, for example, a CPU, a microprocessor or other programmable circuits may perform, in particular, safety-relevant functions. The redundant implementation also enables consistent data to be sent via a plurality of VLANs and to be provided in the network.

Further embodiments of the network arrangement provide that at least one first ring topology and one second ring topology are formed, wherein the ring topologies are coupled using one or more coupling-switch devices. For example, the ring topologies may be coupled by the coupling-switch devices such that ports of the coupling-switch devices are enabled in each case solely for one of the VLANs. Hence, the coupling-switch device also isolates or separates the VLANs that are used. In this case, the two ring topologies may have two separate physical lines.

The network arrangement may, in particular, be part of a vehicle. Other areas of use such as automation networks are also possible, however.

The network devices are each embodied, for instance, as an individual FPGA, ASIC, IC chip or hard-wired microcircuit.

In addition, a computer program product is proposed that on one or more program-controlled devices brings about the implementation of the method as described above for operating a network arrangement.

A computer program product such as a computer program may be provided or supplied, for instance, in the form of a storage medium such as memory card, USB stick, CD-ROM, DVD or even in the form of a downloadable file from a server in a network. This provision may be performed in a wireless communications network, for example, by transmitting a relevant file containing the computer program product or the computer program. A network device as described above, in particular, is suitable as the program-controlled device.

Further embodiments also include combinations of those method acts, features or embodiments of the method, the network arrangement, the network device or a network node that are described above or below with regard to the exemplary embodiments, even if such combinations have not been stated explicitly. A person skilled in the art will also add or modify individual aspects as improvements or additions to the respective basic form of the embodiments.

In the figures, elements that are the same or have the same function have been given the same reference signs unless otherwise stated.

DETAILED DESCRIPTION

Figure 1:
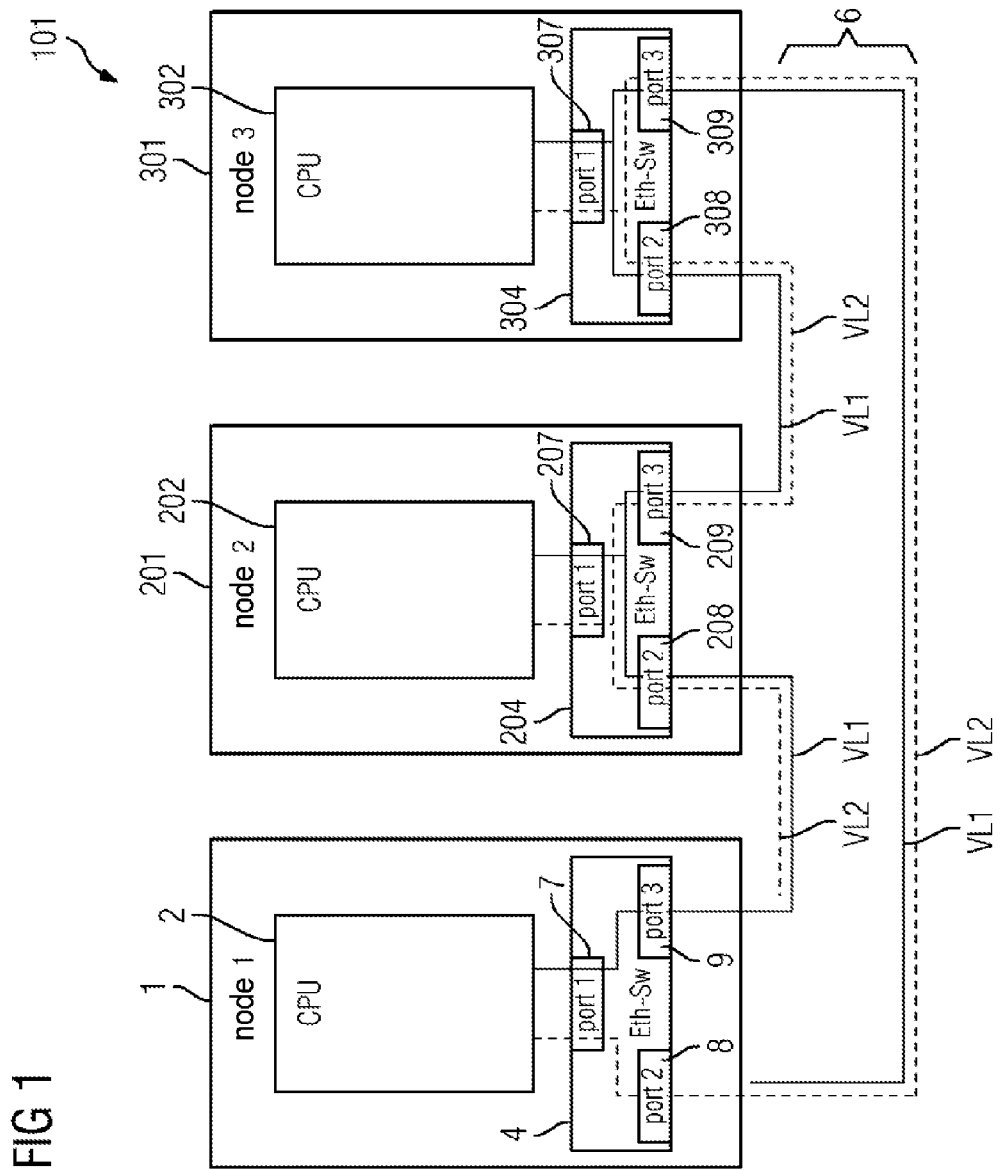
FIG. 1 depicts a schematic diagram of a first embodiment of a network arrangement.

FIG. 1 shows a schematic diagram of a first embodiment of a network arrangement. The network arrangement, for instance, may be embedded in an Ethernet structure and may include a plurality of network devices, which also may be referred to as network nodes, network users or control components. Terms such as network elements or network components are also common.

In FIG. 1, three network devices 1, 201, 301 are shown in the network arrangement 101. The network devices 1, 201, 301, which are labeled respectively as "node 1", "node 2" and "node 3", each includes a control device 2, 202, 302, which may be embodied as a microprocessor or a CPU, for example. The control device 2, 202, 302 may perform specific functions in the network. Functions as an actuator or sensor measurements are possible here.

A switch device 4, 204, 304 is assigned to the respective CPU 2, 202, 302. The switch device 4, 204, 304 includes a first port 7, 207, 307 that is communicatively connected to the respective CPU 2, 202, 302. In addition, each switch device 4, 204, 304, which is embodied as an internal Ethernet switch for instance, has two further ports 8, 9, 208, 209, 308, 309 for coupling to a communications network 6 that provides data lines and hence communications paths for data packets exchanged between the network devices 1, 201, 301.

The network arrangement 101 is operated by providing two VLAN networks VL1, VL2. The network devices 1, 201, 301 are arranged in a ring topology, e.g., a communicative connection, for example in the form of a cable or another network link, is provided between the network device 1 and 201.

In addition, the network device 201 is communicatively coupled to the network device 301, and the network device 301 is coupled to the network device 1. This enables a ring topology for the VLANs VL1, VL2.

To prevent the network being loaded by circulating data packets, in particular, for the embodiment as Ethernet, certain ports of the switch devices 4, 204, 304 are blocked or disabled for the individual VLANs VL1, VL2. The VLAN ring VL1 is implemented by potential data paths between the port 9 of the first switch device 4, the ports 208, 209 of the second switch device 204, the ports 308, 309 of the third switch device 304, and (although disabled) the port 8 of the first switch device 4.

Alternatively, it is also possible instead of disabling a port, merely to inhibit forwarding of the relevant data packets. For instance, it is possible to provide the CPU 2 with data packets from the VLAN VL2 that are present at the port 9, but not to make the data packets available at the port 8. The switch-device/control-device combinations 202, 204 and 302, 304 may be configured similarly. This may also be referred to as filtering the data packets of the one VLAN VL2.

In the diagram in FIG. 1, the network device 1 is a sending network device, e.g., supplies data to the other nodes 201, 301 present in the network. The second VLAN VL2 is in the form of a ring through a communications path between the port 8 of the first switch device 4, the port 309 of the third switch device 304, the port 308 of the third switch device 304 and the port 209 of the second switch device 204, and between the port 208 of the second switch device 204 and the port 9 (which is disabled for the VLAN VL2) of the first switch device 4.

It is evident that for the sending network device 1, e.g., when the CPU 2 is transferring data via the port 7 to the switch device 4, the data is being transmitted both via the VLAN VL1 and via the VLAN VL2. In this case, the first port 8 is enabled for the VLAN VL2, whereas the respective other port 9 is disabled for the VLAN VL2. Conversely, the port 9 is enabled for the VLAN VL1 and the other port 8 is disabled for the VLAN VL1. Thus, the deactivated port in each case breaks an unwanted loop closure in the VLAN. Thus, in a VLAN, all the ports are enabled except the non-sending port of the source node, which in FIG. 1 is the network device 1.

Broadcast or multicast destination addresses may be used for sending, such that all the other nodes or network devices 201, 301 in the ring network receive the data. Unicast addresses are also possible in order to reach individual control devices.

Figure 2:
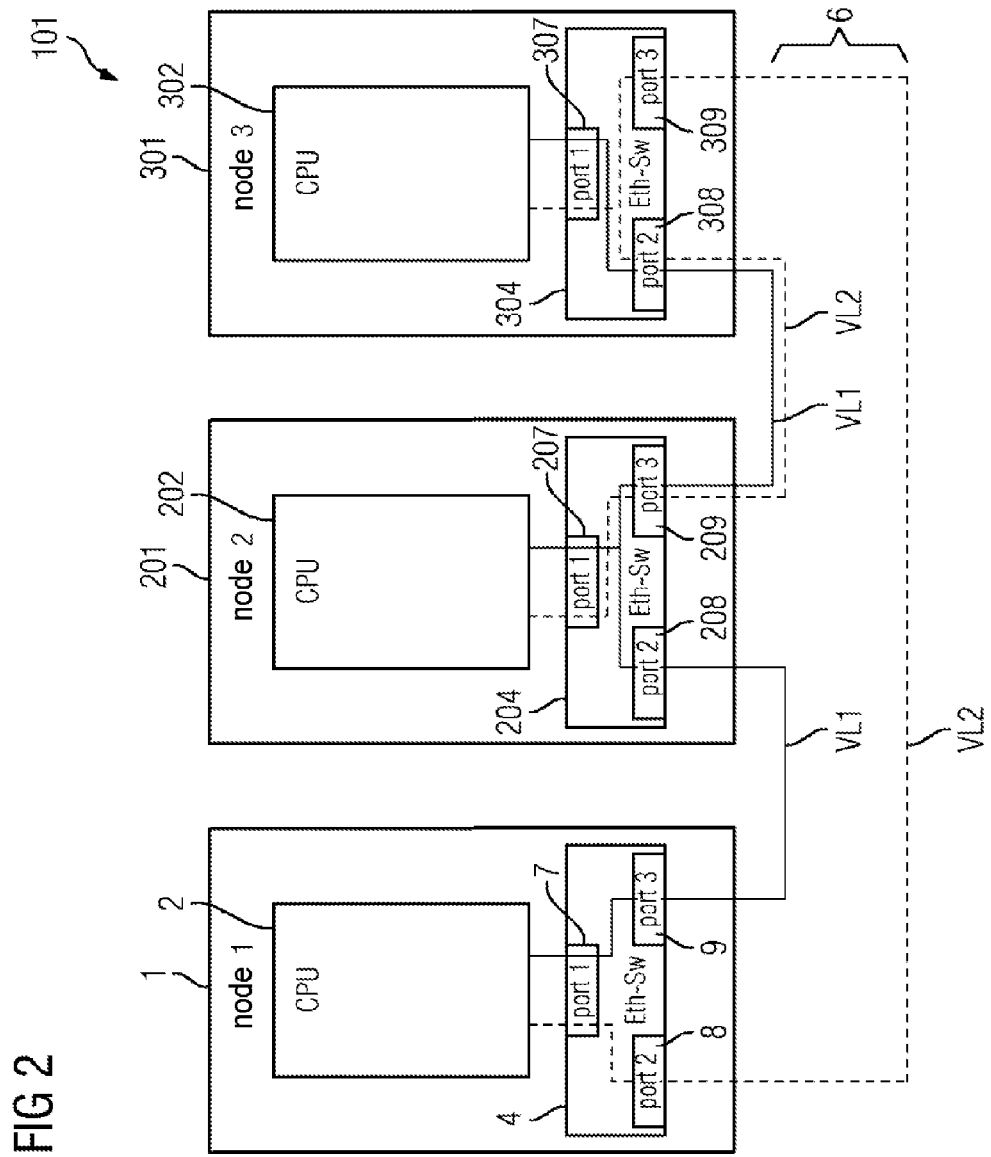
FIG. 2 depicts a schematic diagram of a second embodiment of a network arrangement.

FIG. 2 illustrates an extension of the method for operating a network arrangement having a ring topology. FIG. 2 shows essentially the same elements as those described in FIG. 1 and shows two provided VLAN rings VL1 and VL2.

In order to improve further the protection from an unwanted loop closure in the respective VLAN, the network devices 1, 201, 301 together with the switch devices 4, 204, 304 of same are configured such that adjacent ports of different network devices 1, 201, 301 are also inhibited from forwarding data packets in a respective VLAN, which might result in a closure of the loop.

Regarding the provided VLAN VL1 by way of example, it is evident that from the sending network device 1, or the node 1, the port 8 that is not used for sending is disabled for the VLAN VL1. This corresponds to the situation that was likewise shown in FIG. 1. In addition, port 309, which is located in a network device 301 adjacent in the ring, and which is directly connected via the port 8 enabled for the other VLAN VL2, is disabled. Hence, both the port 8 of the sending network device 1 and the port 309 of the network device 301 receiving from the other VLAN VL2 are disabled. Effectively there are two ports, namely the ports 8 and 309 that constitute a closed-loop protection. Thus, even if there is an error in the forwarding table of one of the switches 4 or 304, a loop closure does not occur that may result in a collapse of the Ethernet. Similarly, the ports 9 and 208 are inhibited or disabled for the VLAN VL2.

Figure 3:
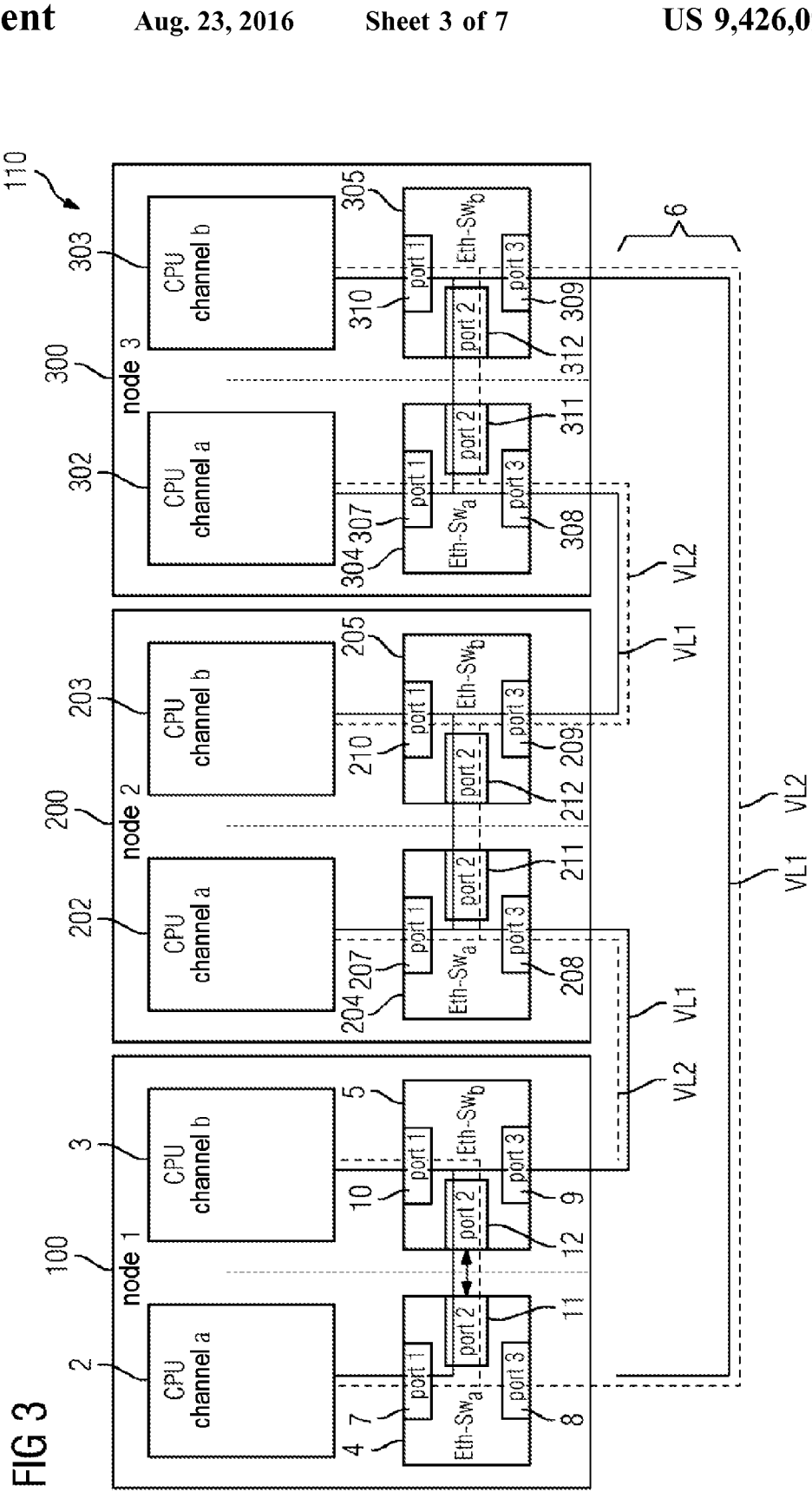
FIG. 3 depicts a schematic diagram of a third embodiment of a network arrangement.

FIG. 3 shows a further embodiment of a network arrangement 110. In this case, the network devices 100, 200, 300 used are each redundantly equipped with two CPUs 2, 3, 202, 203, 302, 303 and associated switch devices 4, 5, 204, 205, 304, 305. The switch devices of a network node are communicatively coupled to each other. In the network node 100, the switch device 4 is coupled to the switch device 5 internally via ports 11, 12. The switch devices 204, 205 of the second node 200 are similarly coupled to each another internally via ports 211, 212. Similarly, the switch devices 304, 305 of the third node 300 are coupled to each other via the ports 311, 312.

The redundant availability of CPUs 2, 3, 202, 203, 302, 303 means it is possible to provide the functionality of the network devices 100, 200, 300 redundantly, and therefore reliable data may still be generated if one of the CPUs fails. In addition, the redundant and separate implementation of the switch devices 4, 5, 204, 205, 304, 305 achieves a further level of safety. The VLANs VL1, VL2 are implemented as was described with regard to FIG. 1. The respective CPUs 2, 3, 202, 203, 302, 303, however, receive the data sent via the VLANs redundantly, and therefore a consistency check may be performed internally.

The sets of data from the redundant CPUs, which are labeled "channel a" and "channel b", may be linked to each other by a coding mechanism. For instance, data may be generated by the CPU 2 that by bit-inversion matches the data from CPU 3. At another point in the network, it is then possible to compare the respective sets of data from the channels A and B, and to detect errors in the data transmission or to identify failures of network devices.

Figure 4:
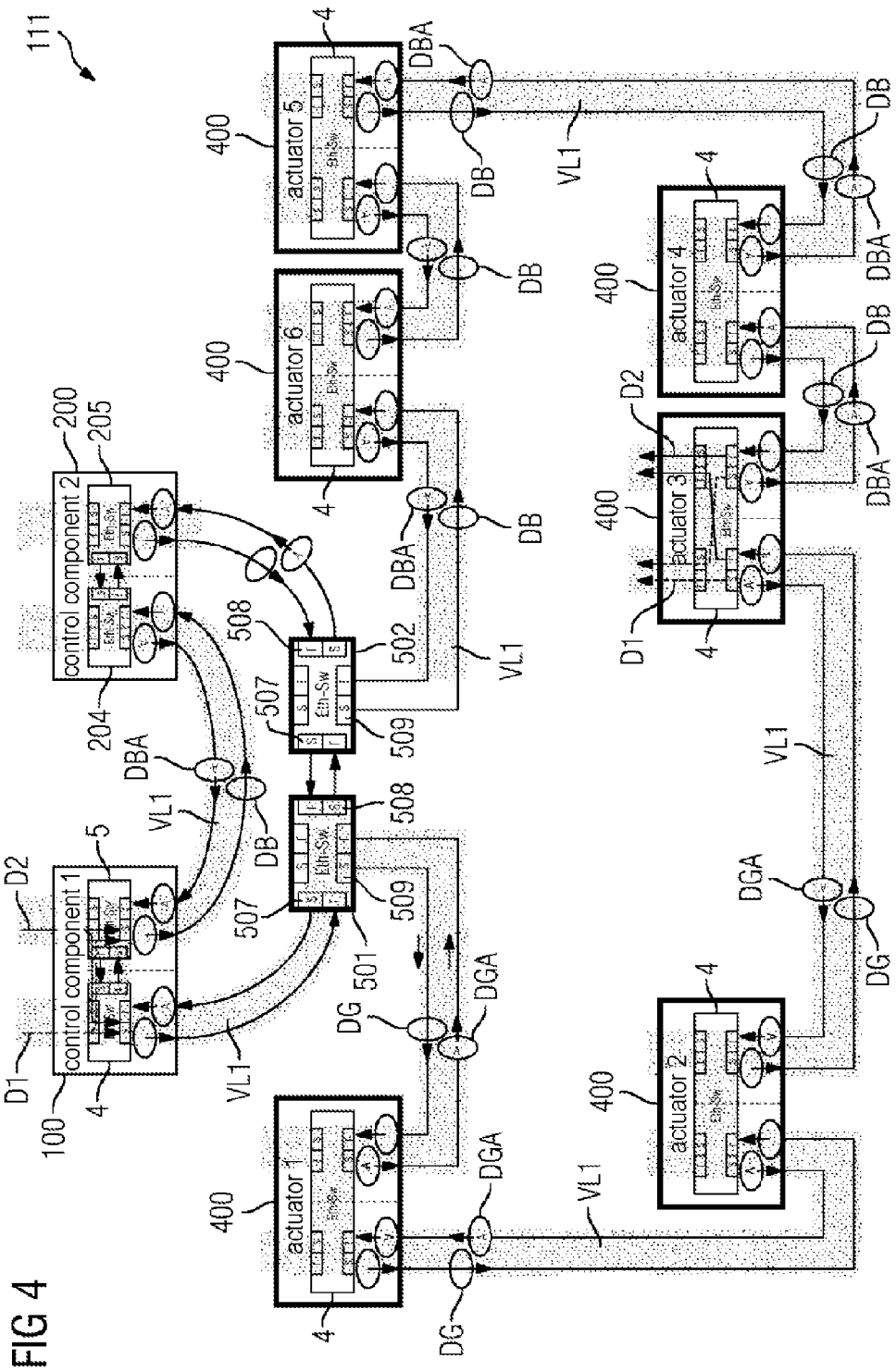
FIGS. 4 and 5 depict schematic diagrams of a fourth embodiment of the network arrangement having two ring topologies and communications processes for the purpose of explaining aspects of the method for operating the network.
Figure 5:
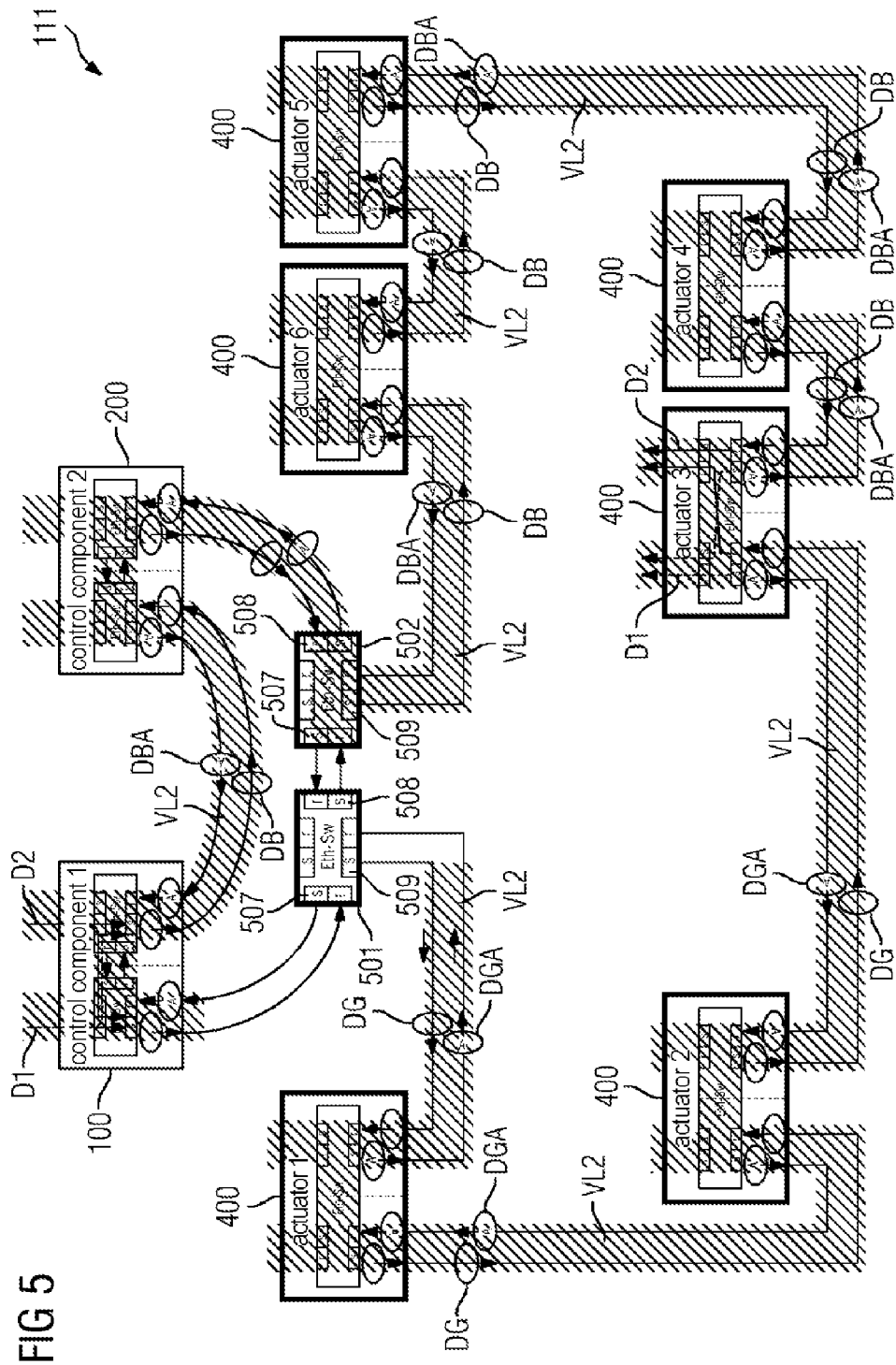

FIGS. 4 and 5 show a fourth embodiment of a network arrangement 101. The network arrangement 111 may be part of a motor vehicle, for example, in which network arrangement, the control components and various actuators, e.g., final control elements, are embodied as network devices.

In FIGS. 4 and 5, two ring topologies are formed and are coupled to one another via central Ethernet switches 501, 502. In this case, two control components or network devices 100, 200 are coupled to the two Ethernet switches 501, 502 in a ring.

A further, second ring is formed by network devices 400, which are labeled "actuator 1" to "actuator 6". The actuator devices 400 each have an Ethernet switch 4 and essentially have the same design as the network device 1 shown in FIG. 1. No CPUs are shown in the actuator devices 400. The network arrangement 111 is based on an Ethernet protocol, e.g., bidirectional or duplex connections are possible. This means that data communication may take place in two directions.

The provision of a first virtual LAN VL1 for sending data from the control component 100 to the actuator component 400 labeled "actuator 3" is highlighted by a dotted pattern. The respective communications direction is indicated by the arrows between the network components 100, 200, 400, 500.

The data packets DG here correspond to those data packets that travel via the left-hand branch, e.g., from the control component 100 via the switch device 501 and the actuator devices 400 labeled "actuator 1" and "actuator 2". The data packets DGA are returning data packets.

A right-hand branch containing data packets DB and DBA runs from the control component 100 to the control component 200 via the switch device 502 and the network devices 400 labeled "actuator 4" to "actuator 6".

When sending the data from the control component 1, 100 via the VLAN VL1, disabling the ports 509, 507 and 508 of the switch device 502 for data of the VL1 achieves an unwanted loop closure for the VLAN VL1.

FIG. 5 shows the operating situation of the network containing the second VLAN VL2. The network paths are indicated here by hatched shading. For the VLAN VL2, the first Ethernet switch device 501, or, more precisely, the ports 507, 508, 509 thereof, is disabled. This means that the network may not be overloaded by circulating data packets. The ports given individual reference signs in FIGS. 4 to 7 are a combination of send and receive ports. It may be seen from the arrows indicating a data direction, and from the symbols "s" and "r", the port(s) that are activated or disabled. For instance, in FIG. 4, the send port "s" of the port combination 509 of the switch device 502 is disabled for the VLAN VL1.

The two VLANs VL1, as shown in FIG. 4, and VL2, as shown in FIG. 5, are operated simultaneously, and therefore data is transmitted simultaneously from the control component 1, 100 to the actuator component actuator 3, 400 to be controlled. Even if errors occur in data packets that are transmitted via a first VLAN VL1, the actuator component 3, 400 still receives data reliably via the second VLAN VL2.

Figure 6:
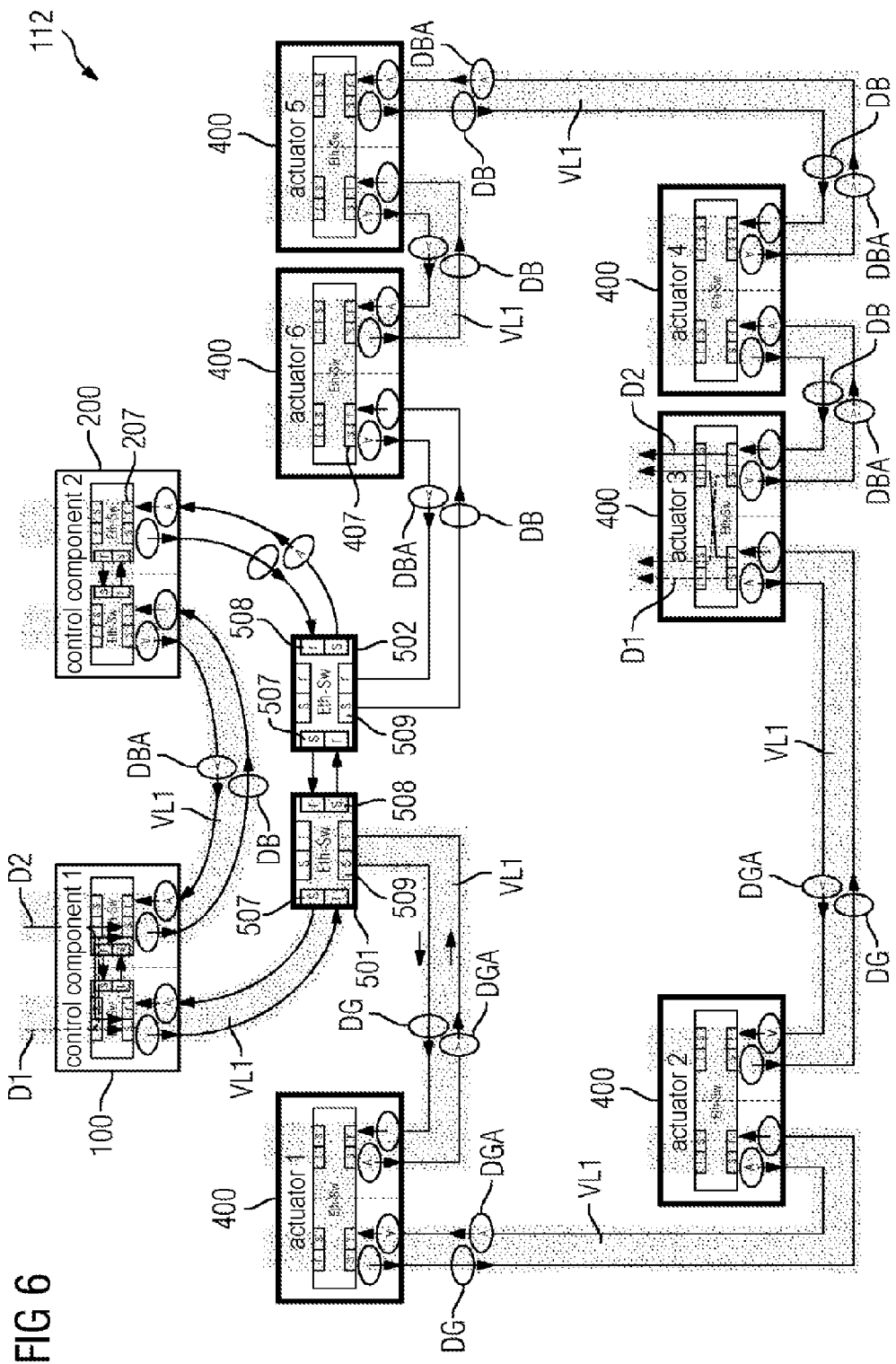
FIGS. 6 and 7 depict schematic diagrams of a fifth embodiment of the network arrangement having two ring topologies and communications processes for the purpose of explaining aspects of the method for operating the network.
Figure 7:
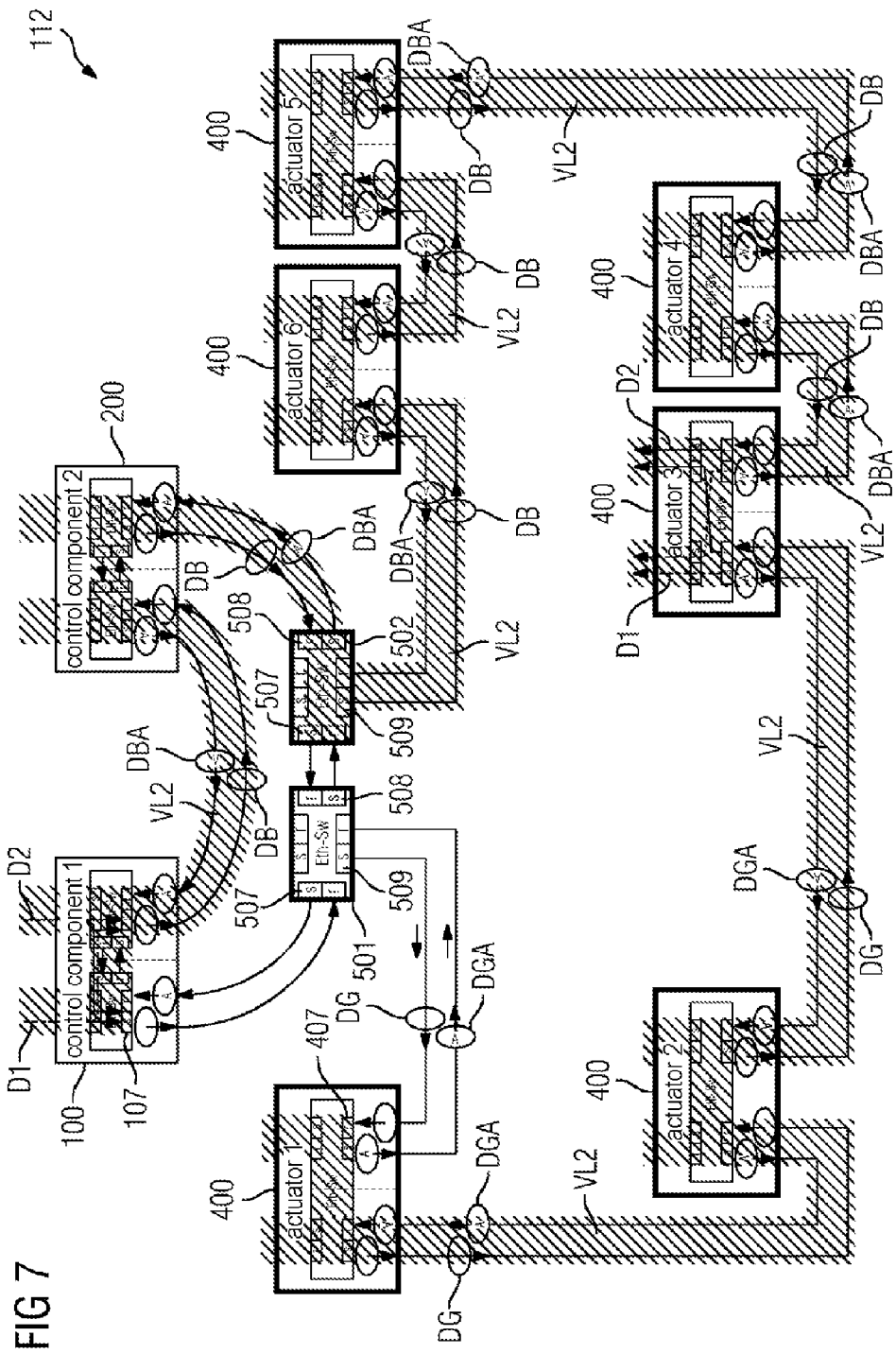

In order to minimize further the risk of an unwanted loop closure in one of the two VLANs, additional ports may be blocked or disabled at control components or network components in the network arrangement. This is illustrated in greater detail in FIGS. 6 and 7. FIGS. 6 and 7 show a network arrangement 112 that include the same components as the network arrangement 111 from FIGS. 4 and 5. A VLAN VL1 (see FIG. 6) and a VLAN VL2 (see FIG. 7) are likewise provided. The VLAN VL1 is highlighted by a dotted pattern and the VLAN VL2 is shaded in a hatched pattern.

For operating the VLAN VL1, the Ethernet switch 502, or, more precisely, the ports 507, 508, 509 thereof, is disabled. Data packets corresponding to the VL1 are not forwarded. In addition, the ports 207 of the adjacent control component 2, 200 are disabled, and the ports 407 of the actuator component 6, 400 that is likewise adjacent in the second ring. The isolation or termination of the VLAN ring VL1 is thereby further improved. Even if errors exist in forwarding tables, for example in the Ethernet switch 502, the ports 407 and 207 of the actuator component 6, 400 and of the control component 2, 200, stop the relevant data packets.

In addition, a similar reliability measure is provided for the second VLAN VL2. This is shown in FIG. 7. The Ethernet switch 501, or, more precisely, the ports 507, 508, 509 thereof, are blocked for the VLAN VL2. Furthermore, the adjacent ports 207, 407 of the control component 1, 100 of the upper ring topology, and of the actuator device 400 of the lower ring topology, are disabled. Thus, even when there are errors in forwarding tables of the Ethernet switch 501, circulation of data packets from the VLAN VL2 and hence unnecessary loading of the network infrastructure may be reliably prevented.

Variants may be used in addition to the methods and measures shown for redundant and reliable sending of data via VLANs. For instance, a VLAN Cross Connect (VLAN-XC) may be performed between source node and destination node, or methods such as Provider Backbound Bridging Traffic Engineering (PBB-TE) may also be employed. In the VLANs used in the form of a ring, it is also possible to employ PRP, because a plurality of VLANs is provided simultaneously.

Although two separate VLANs VL1, VL2 are shown in the examples, it is also possible to provide further VLANs by extending the port disabling Implementing more than two VLANs achieves a further improvement in the communications reliability.

In addition to the two ring topologies shown, certain embodiments may have three or more rings coupled to one another.

Although the invention has been illustrated and described in greater detail by the exemplary embodiments, the invention is not limited by the disclosed examples, and a person skilled in the art may derive other variants therefrom that are still covered by the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a network arrangement that comprises a plurality of network devices coupled to one another in a ring topology, wherein each network device has a control device and a switch device comprising at least two ports for coupling to a communications path, the method comprising:

providing, simultaneously, a first virtual local area network (VLAN) and a second VLAN in the ring topology;

sending a data packet from the control device of a sending network device of the plurality of network devices via a first port of a selected switch device into the first VLAN;

disabling a second port of the selected switch device of the sending network device for the first VLAN; and disabling an additional port belonging to an additional switch device for the first VLAN of a second network device receiving the data packet via the first VLAN, wherein the additional port is coupled via the second VLAN to the second port of the selected switch device of the sending network device.

2. The method as claimed in claim 1, further comprising:

sending the data packet from the control device of the sending network device via the second port of the selected switch device into the second VLAN; and disabling the first port of the selected switch device of the sending network device for the second VLAN.

3. The method as claimed in claim 2, wherein the data packet is sent into the first VLAN and the second VLAN simultaneously.

4. The method as claimed in claim 2, further comprising:
comparing the data packets that were received via the first VLAN with the data packets that were received via the second VLAN.

5. The method as claimed in claim 1, wherein the data packet is sent into the first VLAN and the second VLAN simultaneously.

6. The method as claimed in claim 1, wherein the data packet is sent using a multicast address.

7. The method as claimed in claim 1, wherein the data packet is sent using a broadcast address.

8. The method as claimed in claim 1, further comprising:
comparing the data packets that were received via the first VLAN with the data packets that were received via the second VLAN.

9. The method as claimed in claim 1, wherein the network devices are configured to work in accordance with an Ethernet protocol.

10. The method as claimed in claim 1, wherein all the ports of each switch device in the plurality of networks are enabled for a first VLAN except for the second port that belongs to the selected switch device of the sending network device.

11. A network arrangement comprising:
network nodes coupled to one another in a ring topology, wherein each network node has a control device and a switch device comprising a first port and a second port for coupling to a communications path;
wherein the network nodes are configured to provide simultaneously at least two virtual local area networks (VLANs) in the ring topology;
wherein the network nodes are configured such that when a data packet is sent from a control device of a network node via a first port of a selected switch device into a first VLAN, and a second port of the selected switch device is disabled for the first VLAN; and
wherein the network nodes are configured to disable an additional port belonging to an additional switch device for the first VLAN of a second network device receiving the data packet via the first VLAN, wherein the additional port is coupled via a second VLAN to the second port of the selected switch device.

12. The network arrangement as claimed in claim 11, wherein at least one network node comprises a first switch device and a second switch device, wherein the first switch device is assigned to a first control device, and the second switch device is assigned to a second control device, and wherein the switch devices each comprise at least two ports, and the first and second switch devices are communicatively coupled to one another.

13. The network arrangement as claimed in claim 12, wherein the network nodes form a first ring topology and a second ring topology, wherein the ring topologies are coupled using one or more coupling-switch devices.

14. The network arrangement as claimed in claim 13, wherein the coupling-switch devices are configured such that ports of the coupling-switch device are enabled solely for one of the at least two VLANs.

15. The network arrangement as claimed in claim 11, wherein the network nodes form a first ring topology and a second ring topology, wherein the ring topologies are coupled using one or more coupling-switch devices.

16. The network arrangement as claimed in claim 15, wherein the coupling-switch devices are configured such that ports of the coupling-switch device are enabled solely for one of the at least two VLANs.

17. The network arrangement as claimed in claim 11, wherein the network arrangement is part of a vehicle.

* * * * *